No. 798,078. PATENTED AUG. 29, 1905.
J. SIMPSON.
SCREWED PIPE UNION.
APPLICATION FILED SEPT. 11, 1903.

WITNESSES

INVENTOR
John Simpson
BY
ATTORNEYS

UNITED STATES PATENT OFFICE.

JOHN SIMPSON, OF SYDNEY, NEW SOUTH WALES, AUSTRALIA.

SCREWED-PIPE UNION.

No. 798,078.          Specification of Letters Patent.          Patented Aug. 29, 1905.

Application filed September 11, 1903. Serial No. 172,813.

*To all whom it may concern:*

Be it known that I, JOHN SIMPSON, works manager, a subject of the King of Great Britain and Ireland, residing in the city of Sydney, in the State of New South Wales, Australia, have invented a new and useful Improved Screwed-Pipe Union, of which the following is a specification.

My invention relates to unions for connecting screwed pipes; and it relates also to unions for connecting pipes, cocks, valves, and other fittings to pipes and fittings of larger gage and to elbows and other parts having bends or large bases. Its object is to obtain a perfect mechanical screwed union-coupling of cheap and simple construction and to dispense with soldered joints, which sometimes cause trouble as a result of corrosion and galvanic action.

My invention is of value where two parts are to be connected whose dimensions or design are such that a union-nut cannot be brought up behind a shoulder in the usual way. It meets this difficulty by providing an insertible shoulder-ring in the shape of a spring-piece, which is sprung home into a recess on the piece carrying the nut after the nut has been put on same, the design of the parts being such that the pressure of the nut holds the ring into its seating and prevents any movement thereof.

Figure 1:
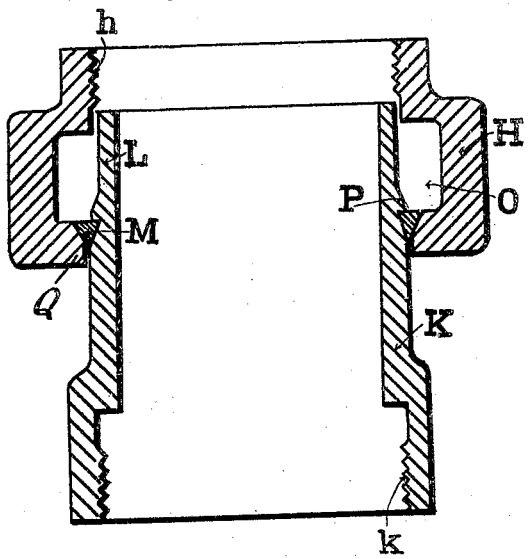
Figure 2:
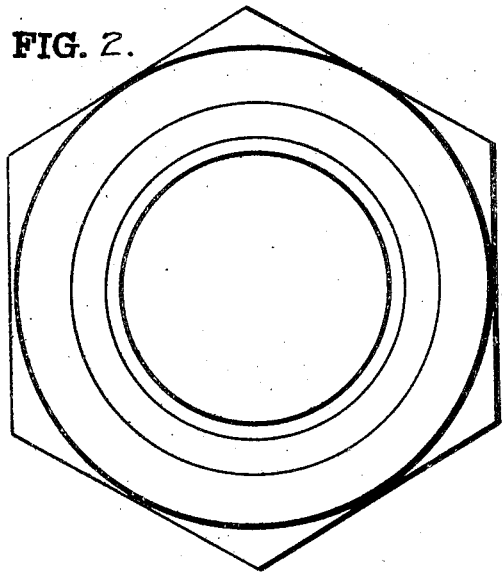
Figure 3:
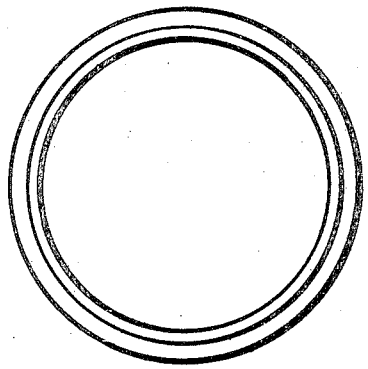
Figure 4:
Figure 5:
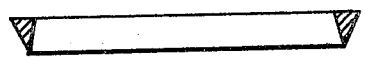

Referring to the annexed drawings, Figure 1 is a longitudinal section through my coupling; Fig. 2, an end view of same; Fig. 3, a plan of the insertible split-ring collar; Fig. 4, a side elevation of same, and Fig. 5 a section through same.

The union consists of a union-nut H, tapped at *h* to take the thread on one of the pipes, and a coupling-collar K, tapped at *k* to take onto the thread on the other pipe to be coupled. The bored portion of the part K corresponds in bore with the pipes to be connected. A gasket may be inserted against the end of the coupling K, covered by the union-nut, so as to make a close joint between the same and the end of the pipe on which the union-nut H screws.

Rearward of the neck L of the part K a groove M is turned, and into this groove M the split collar N is fitted. The inner face of groove M is inclined to the axis of the pipe K. The collar is formed as a ring and a scarf cut is put in it, as indicated in Fig. 4. This cut allows of the collar being sprung open sufficiently to enable it to be worked into the cavity O in the body of the union-nut H. After it has been worked into its place in this cavity the coupling-piece K is driven in so as to force the shoulder P past it, which done it will snap into the recess M. The two parts K and H are thus locked together. The outer side of the ring N takes its bearing against the conical edge of the ring Q of the nut H in order that when the nut H is screwed home the pressure put upon the ring N, which now forms a shoulder on the coupling-piece K, bringing the two pipe lengths together, that pressure will also tend to compress the ring N into the recess M and hold it as securely therein as if it were an integral part of the coupling-piece K. The outer surface of the coupling-piece K rearward of the recess M is turned cylindrically to enable the nut H to be dropped back, so that its forward end may be brought face to face with the pipe end on which the nut is to be screwed.

In operation the coupling-piece K having been locked into the nut H by first inserting the ring N and then driving home the coupling-piece K until the ring N springs into its recess M, the part K is screwed onto one of the pipe ends. Then the coupling is brought in line with the other pipe end to be connected, and the nut H is advanced out and screwed home on such other pipe end to make the joints, for better security, if necessary, a gasket being inserted where the pipe and the coupling butt.

What I claim as my invention, and desire to secure by Letters Patent, is—

A sleeve-union for coupling screwed pipes consisting of a sleeve having an angular recess therein, the inner face of said recess being inclined to the axis of the sleeve, a nut on the sleeve having a flange having an inclined face and an inserted split ring triangular in section set in the angular recess in the sleeve and adapted externally to the inclined flange of the nut, substantially as described.

In testimony whereof I have hereunto set my hand in presence of two subscribing witnesses.

JOHN SIMPSON.

Witnesses:
L. LUCAS,
W. J. DAVIS.